United States Patent Office 3,226,445
Patented Dec. 28, 1965

3,226,445
ALKYLTHIOBENZENEPOLYTHIOLS
Walter Reifschneider, Midland, Mich., assignor to The Dow Chemical Company, Midland, Mich., a corporation of Delaware
No Drawing. Filed June 27, 1962, Ser. No. 205,505
4 Claims. (Cl. 260—609)

The present invention is directed to thioethers and in particular is directed to novel thioethers corresponding to the formula

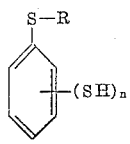

In the present specification and claims, R represents an alkyl group containing from 1 to 24, inclusive, carbon atoms and $n$ is an integer from 2 to 5, inclusive, the sum of the integer $n$ and the number of carbon atoms in R being at least 3.

The novel compounds are viscous liquids, very slightly soluble in water but readily soluble in various common organic solvents such as lower alkanols, benzene and the like. The compounds are useful as pesticides and herbicides, various of them have distinct acaricidal activity. They are useful as intermediates in the preparation of dyestuffs and biologically active phosphate materials; they are also of value as oil additives and as solvent additives in the modification of behavior of mixed solvent systems.

The compounds can be prepared by various processes. A preferred process is one which comprises the first step of partially cleaving a polythiother compound corresponding to the formula

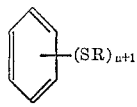

with alkali metal in liquid ammonia and thereafter acidifying the cleavage product. During the cleavage step of the reaction to prepare the present compounds, about one alkylmercapto group reacts with each 2 atoms of alkali metal. Small amounts of mercaptan may be lost in side reactions. Thus, when it is desired to prepare a compound of the present invention in a high state of purity and with a minimum of necessary postsynthesis purification procedure. About $2n$ atoms of alkali metal are supplied to the reaction for each molecule of starting polythioether. However, other proportions may be employed if desired, and unconsumed starting material of whatever identity may, if desired, be recycled into further synthesis process.

In the acidification step, acid can be added to supply a moderate excess of acid in the resulting mixture.

The cleavage reaction goes forward at temperatures over a wide range, but initiates readily at a temperature of ammonia boiling under atmospheric pressure. The reaction can thus be carried out in a pressure vessel, or under ammonia reflux condenser. Under these conditions the reaction goes forward to completion with good yield calculated upon the basis of consumed starting material.

In carrying out the reaction, the benzenepolythioether reactant is first dispersed in liquid ammonia, alkali metal is then dissolved slowly, portionwise, and with stirring in the resulting mixture under ammonia reflux condenser cooled with acetone and Dry Ice. Because it is effective, less reactive than others, and the least expensive useful metal, sodium is the preferred alkali metal. Sufficient sodium is dissolved in ammonia to give a deep blue color.

In the resulting mixture, reaction takes place promptly; reaction times longer than a few minutes are usually unnecessary. Excess sodium is then destroyed by addition of enough ammonium chloride to destroy the blue color. Ammonia is then allowed to evaporate at room temperature to obtain a white to off-white residue.

This residue is taken up in water and acidified with hydrochloric acid, and diluted with ether, whereupon an oily, immiscible organic layer typically separates from an aqueous layer. This organic layer is removed in a separatory funnel, dried over anhydrous sodium sulfate; the dried solution is fractionally distilled first to remove solvent and then, under vacuum, to isolate and purify the desired polythiol compound.

*Example 1.—1-(ethylthio)-2,4,5-benzenetrithiol*

Ammonia is introduced into, and liquefied in a liter flask in an acetone bath chilled by solid carbon dioxide ("Dry Ice"), to obtain about 300 milliliters liquid ammonia near to its boiling temperature. Into this ammonia is introduced 20 grams (.063 mole) finely powdered 1,2,4,5-tetrakis(ethylthio)benzene. To the resulting dispersion is added 1.08 grams (about .0474 gram atom) of clean, freshly cut metallic sodium in small portions, with stirring. Upon completion of the addition, the resulting reaction mixture is permitted to stand for a few minutes, with continued stirring. Ammonium chloride is then added cautiously in sufficient quantity just to destroy the blue color of the ammonia solution.

Thereafter, the flask and contents are removed from the acetone-Dry Ice bath and ammonia is permitted to evaporate. When the ammonia has evaporated substantially completely, there remains a white solid. This solid is taken up in water, and the resulting solution is acidified with hydrochloric acid. As a result of these operations the resulting mixture segregates into an oily organic layer and an aqueous layer. The organic layer is separated and dissolved in diethyl ether. The ether solution is dried over anhydrous sodium sulfate, and the ether solvent vaporized and removed. The remaining oily product is distilled under declining subatmospheric pressures and at gradually rising temperatures. As a result of these procedures there is obtained a purified 1-(ethylthio)-2,4,5-benzenetrithiol product which has a molecular weight of 234.4 and is insecticidal. The assigned structure is confirmed by infra red spectrum analysis. The compound is a yellow oil boiling at 152° to 158° C. under pressure of 0.7 millimeter mercury, absolute.

*Example 2*

The present example essentially duplicates the foregoing except that the starting material employed is 1,2,4,5-tetrakis(methylthio)benzene, and the product compound is 1-(methylthio)-2,4,5-benzenetrithiol.

*Example 3*

In procedures essentially the same as those of Example 1, by the employment of p-bis(tetracosylthio)benzene and one gram-atom equivalent of sodium, there is obtained a 4-tetracosythiobenzenethiol product, having a molecular weight of 478.9. The product is a waxy solid. In water it is toxic to mosquito larvae living therein.

The polykis(alkylthio)benzenes used as starting materials in the present invention are readily prepared by condensation of the corresponding polybromobenzenes and cuprous salt of the corresponding alkyl mercaptans, at a temperature of 80–180° C. in liquid reaction medium in the presence of a nitrogenous base. The resulting mixture is acidified to obtain a precipitate: the precipitate is extracted with solvent such as chloroform, the extract solution dried, solvent removed by vaporization, and the resulting product distilled or recrystallized if desired, to obtain a polykis(alkylthio)benzene product.

If desired, the present compounds can be prepared by the complete cleavage of the starting (alkylthio)benzene to obtain a benzene polythiol, which can thereafter be monoetherified in conventional procedures.

I claim:
1. A compound of the formula

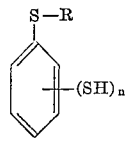

wherein R represents an alkyl group being of from 1 to 24, inclusive, carbon atoms and $n$ is an integer from 2 to 3, inclusive, the sum of the integer $n$ and the number of carbon atoms in R being at least 3.
2. 1-(methylthio)-2,4,5-benzenetrithiol.
3. 4-tetracosylthiobenzenethiol.
4. 1-(ethylthio)-2,4,5-benzenetrithiol.

References Cited by the Examiner

FOREIGN PATENTS 1,099,533   2/1961   Germany.

OTHER REFERENCES

Livingstone: Chem. Abst. 50, 10592 (1956).

CHARLES B. PARKER, *Primary Examiner.*
DANIEL D. HORWITZ, *Examiner.*